Oct. 11, 1966 R. C. ZEIDLER 3,277,987
REMOTE SPRING CLUTCH
Filed March 1, 1965 4 Sheets-Sheet 1
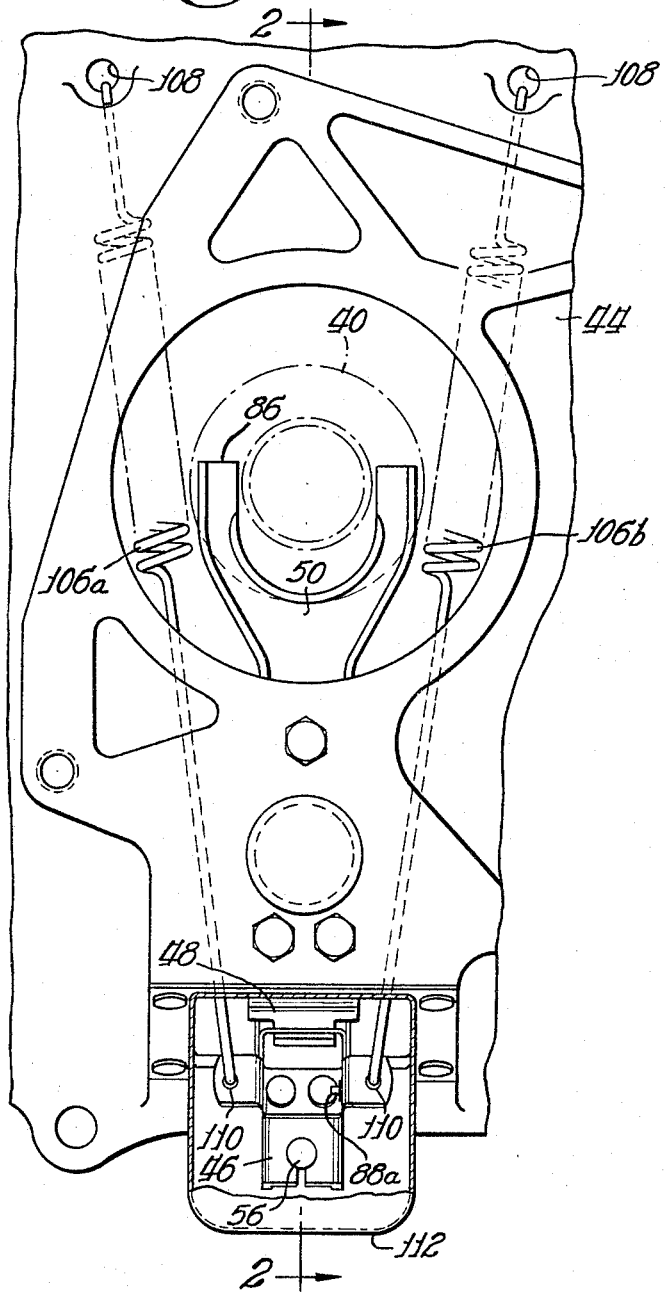
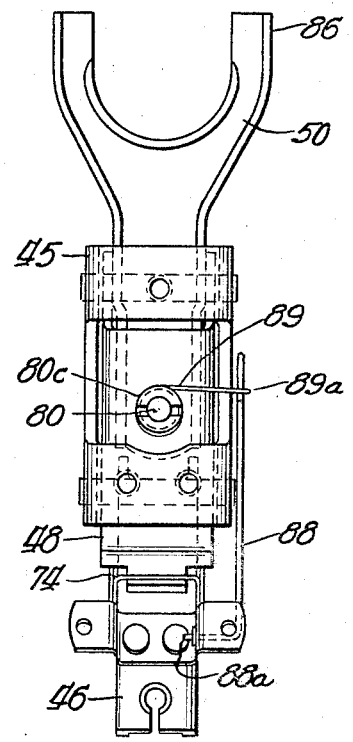
Inventor:
Reinhold C. Zeidler
By: John W. Butcher Atty.

Oct. 11, 1966  R. C. ZEIDLER  3,277,987
REMOTE SPRING CLUTCH
Filed March 1, 1965  4 Sheets-Sheet 2
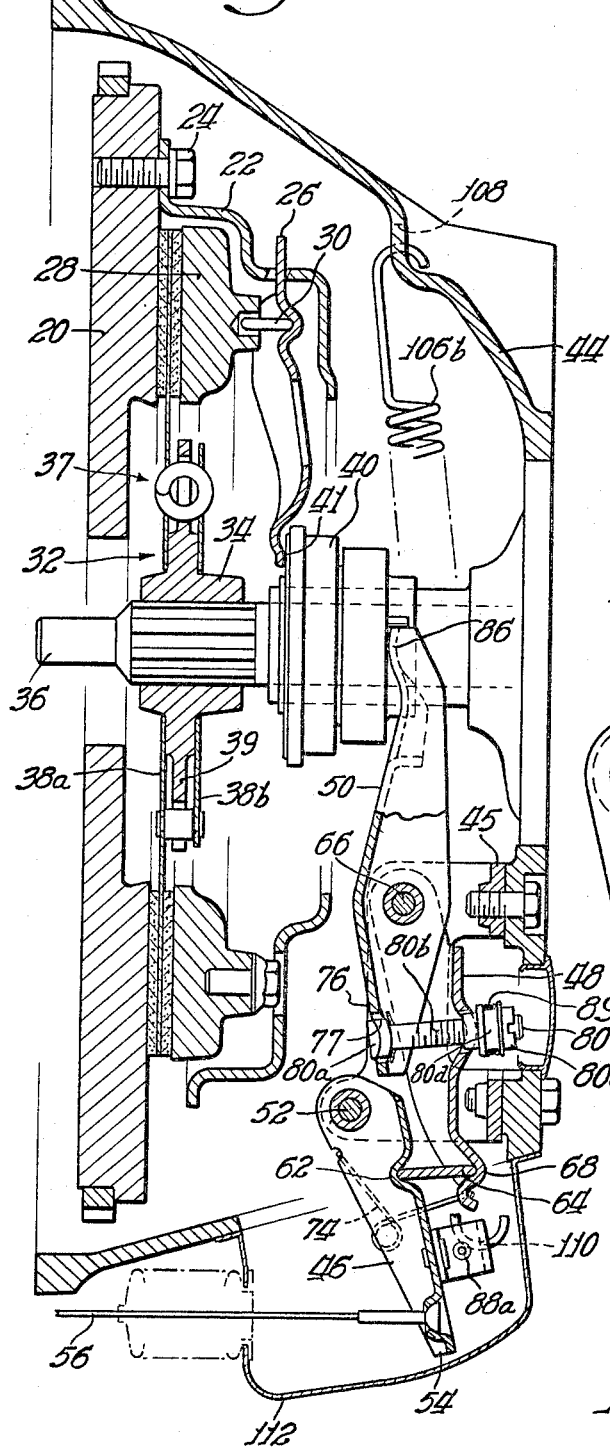
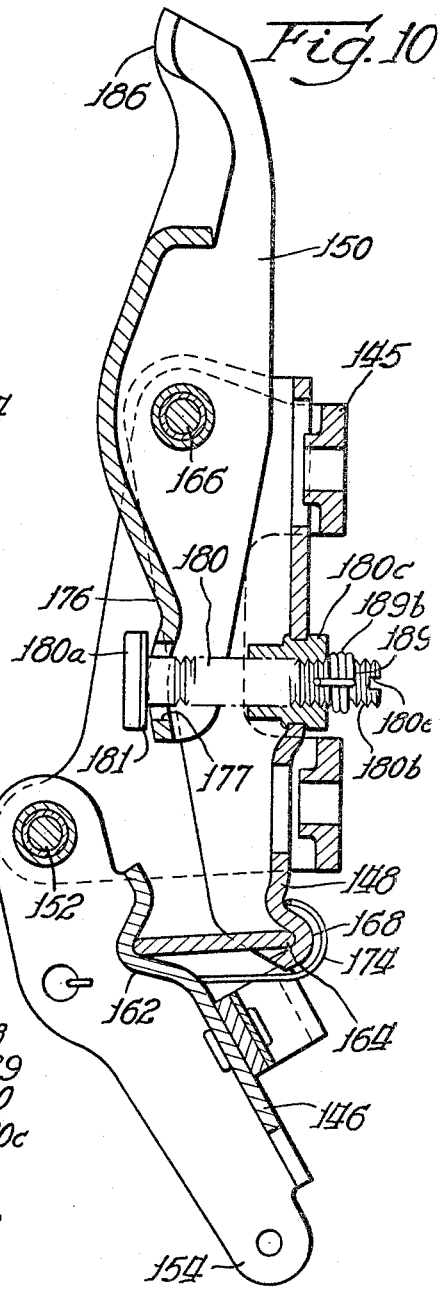
Inventor:
Reinhold C. Zeidler
By: John W. Butcher

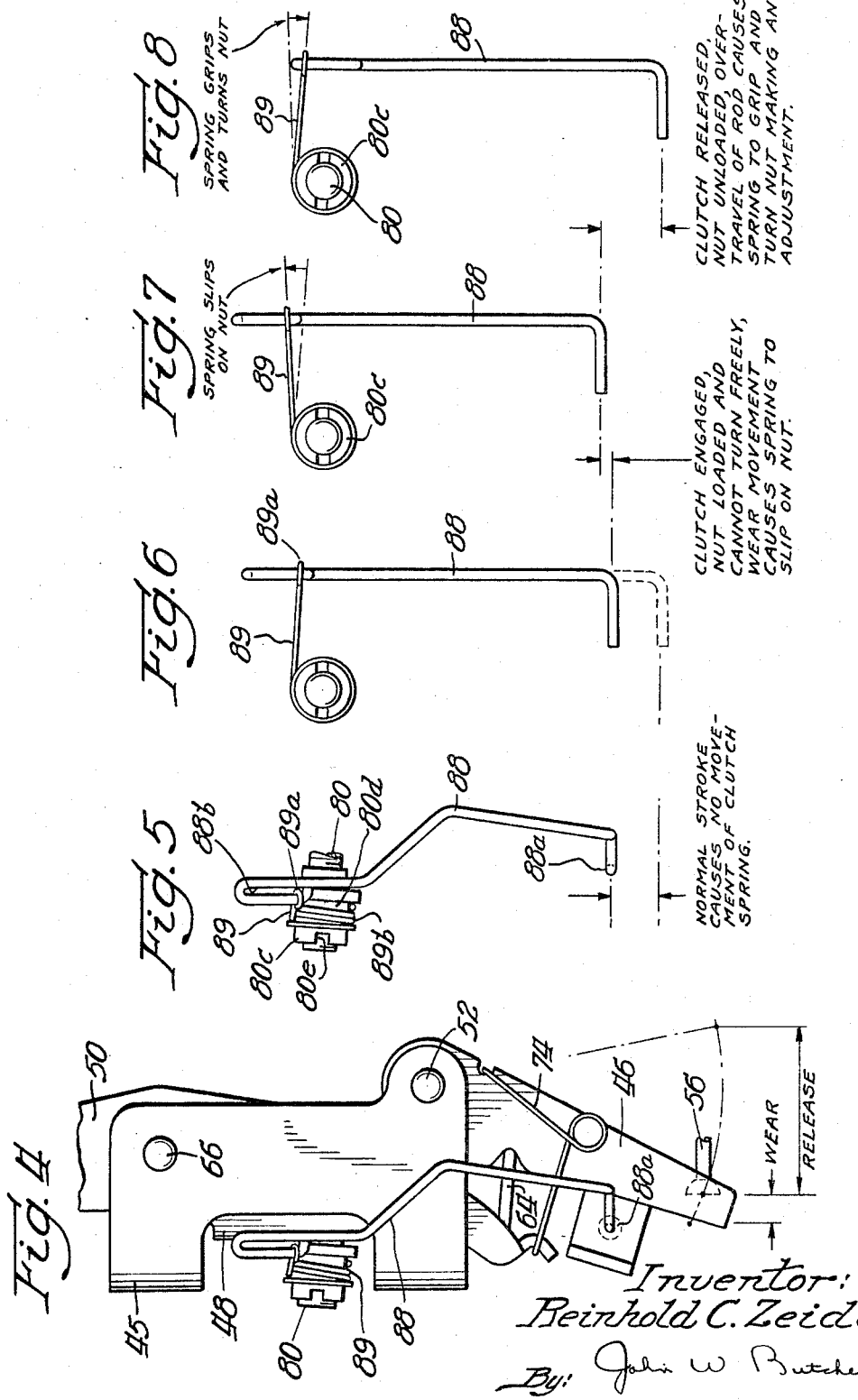

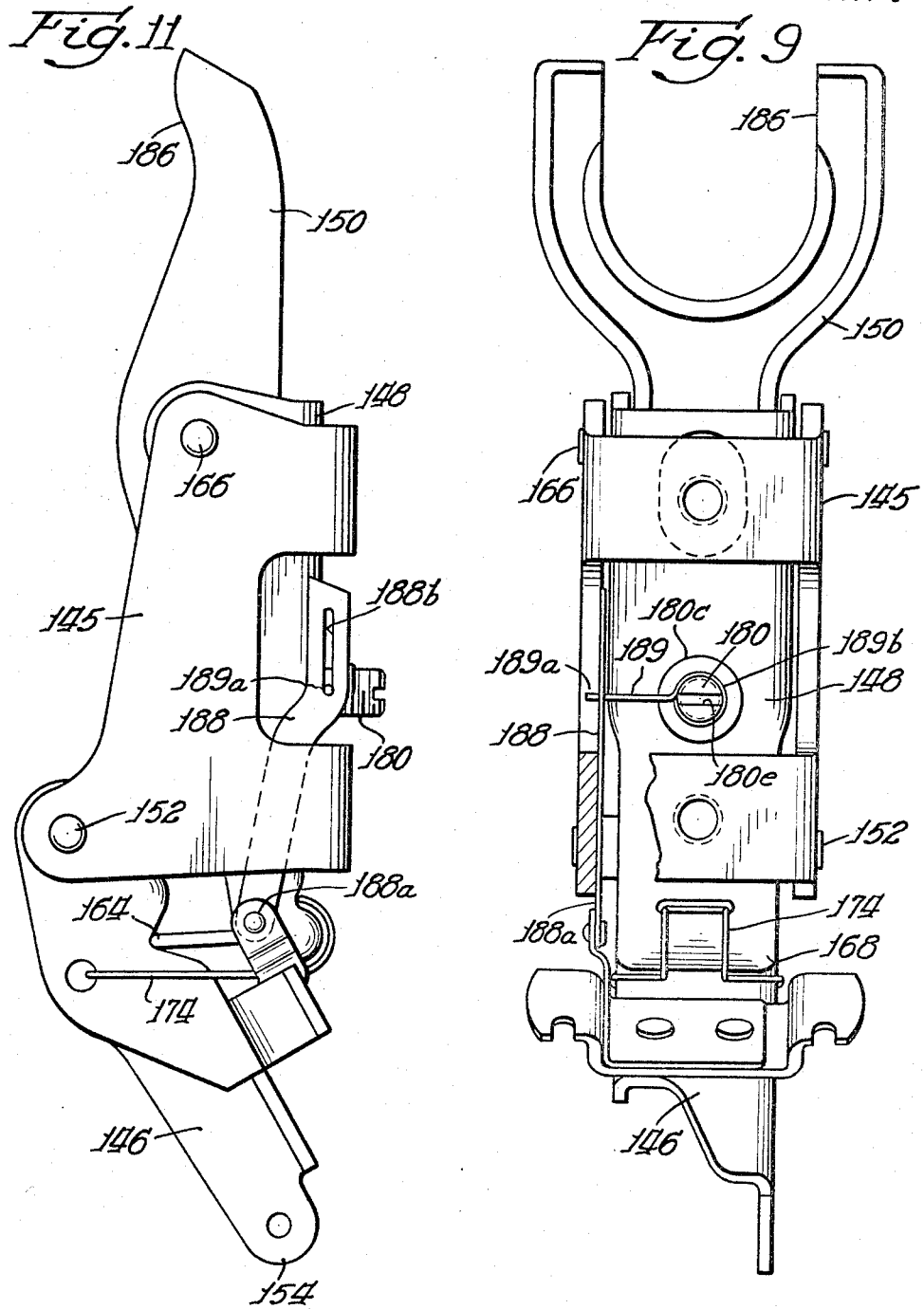

United States Patent Office 3,277,987
Patented Oct. 11, 1966

3,277,987
REMOTE SPRING CLUTCH
Reinhold C. Zeidler, Detroit, Mich., assignor to Borg-Warner Corporation, Chicago, Ill., a corporation of Illinois
Filed Mar. 1, 1965, Ser. No. 436,103
6 Claims. (Cl. 192—68)

This invention relates to a clutch, and more particularly to a clutch suitable or use in automotive vehicles.

A typical automotive clutch includes a cover plate, release levers, a pressure plate, load springs and a driven member. These clutch elements are fastened to the flywheel and are enclosed or partially enclosed in the bell housing. It is conventional practice to position the load springs between the cover plate and the pressure plate to provide a force to engage the clutch. The load spring means normally includes a plurality of springs arranged circumferentially around the clutch between the cover plate and the pressure plate. These springs normally extend parallel to the axis of rotation of the clutch.

The diameter, as well as the axial dimension of a clutch assembly is normally a function of the horsepower that is to be transmitted by the cutch. Thus, as the horsepower of a vehicle increases, it is generally necessary to increase either the diameter of the clutch or the axial dimension of the clutch. It is, however, undesirable to increase either the diameter of the clutch or the axial dimension of the clutch because of space limitations in fitting the clutch into the vehicle.

Numerous attempts have been made to shorten the axial dimension of a clutch structure, one of which has been to position the load spring in a location wherein it does not add to the axial dimension of the clutch. This is accomplished by incorporating the load spring in the control linkage in a manner such that it does not occupy space between the pressure plate and the cover plate. With this type arrangement, the load spring normally exerts a force on the presure plate by way of the clutch release bearing and the clutch release levers. Examples of this type of clutch may be found in United States Patents 2,234,349, 2,234,360, 2,275,387, 2,275,388 and 2,300,187. This type clutch has been termed a "remote spring" clutch as it utilizes a load spring which is remote or outside the clutch cover plate. The load spring means of the prior art devices extends longitudinally substantially parallel to the axis of rotation of the clutch outside the bell housing adjacent the engine assembly or adjacent the transmission assembly. With this type arrangement it is often possible to shorten the axial dimension of the clutch assembly provided there is sufficient space outside the housing within which to locate the spring member. The space problem in locating a spring outside the housing becomes complicated with larger engines which use elaborate exhaust systems and complex accessories such as for example, power steering, power brakes, air-conditioning and the like.

Briefly described, this invention relates to a clutch of the remote spring type wherein the housing which surrounds the driving member, driven member, pressure plate and cover plate is sufficiently large to accommodate load springs positioned transverse with respect to the rotational axis of the clutch. The clutch pedal linkage system affords low clutch pedal forces due to changing lever arms of the linkage members as the clutch moves from an engaged position to a disengaged position. An automatic adjustment means is provided in combination with the linkage system to make minute adjustments between certain of the lever elements with respect to other of the lever elements to compensate for lining wear and to maintain a substantially constant amount of free play in the clutch pedal.

A more complete understanding of the invention will be readily apparent to those skilled in the art from the following detailed description which illustrates certain preferred embodiments in which:

FIGURE 1 is a partial view of the clutch and its associated linkage system;

FIGURE 2 is a view, partially in cross-section, of the clutch and its associated lever system;

FIGURE 3 is an end view of the linkage members;

FIGURE 4 is a side view of the linkage members;

FIGURES 5, 6, 7 and 8 are a schematic representation of the relative positions and strokes of certain members of the automatic adjustment mechanism under various conditions encountered under operating conditions;

FIGURE 9 is an end view, partially in cross-section, of an alternate embodiment of the present invention;

FIGURE 10 is a side view, partially in cross-section, of the embodiment illustrated in FIGURE 9; and FIGURE 11 is another side view of the embodiment illustrated in FIGURE 9.

Referring now to the drawings, and more particularly, FIGURE 2, the flywheel 20 is adapted to be driven by a power plant such as, for example, an internal combustion engine (not shown). The flywheel 20 carries a cover plate 22 which is mounted to the flywheel in a conventional manner by bolts 24. The cover plate 22, in turn, carries a plurality of clutch release levers 26 which are connected to the pressure plate 28 by way of release lever struts 30. A driven member 32 is positioned intermediate the driving member or flywheel 20 and the pressure plate 28 and is adapted to be drivingly mounted on a driven shaft 36 by way of a hub portion 34. The driven member 32 preferably includes a vibration damper 37 interposed between washers 38a and 38b and radial flange 39.

A clutch release bearing 40 is adapted to shift axially with respect to housing 44 to actuate the inner terminal ends 41 of the clutch release levers 26.

The bell housing 44 is provided with an aperture and fittings for mounting a bracket 45 thereon. This bracket carries a control lever 46, transfer lever 48 and a release fork 50.

The control lever is adapted to pivot about a first pivot point 52 which is located on the bracket 45 and this control lever includes an end portion 54 which is adapted to engage a control rod or cable 56. The control lever 46 also includes a second portion 62 which is adapted to receive a strut 64 therein.

The transfer lever 48 is pivotally mounted on the bracket 45 about a second pivot point 66. The transfer lever includes a first portion 68 which is adapted to receive the strut 64. A resilient member 74 is provided between the control lever 46 and the transfer lever 48 to bias the two levers toward each other and thus to maintain the strut 64 in an operative position between the levers.

The release fork is connected to the bracket 45 about the second pivot point 66 and includes a first arm 76. The first arm 76 is provided with an aperture 77 for receipt of an adjustment bolt 80. One end of the adjustment bolt includes a head 80a which is nonrotatably supported in the aperture 77 of the release fork. The other end of the adjustment bolt includes threads 80b which carry a nut 80c. The nut 80c is provided with a spring engaging cylindrical portion 80d and a slot 80e, the function of which will be described later.

The release fork 50 includes a second end 86 which engages the clutch release bearing 40.

An actuator rod 88 (FIGURE 3) is drivingly connected to the control lever 46 at one end 88a thereof and the other end of the actuator rod 88 includes an elongated slot 88b. An adjustment spring 89 is provided with an end 89a which fits within the elongated slot 88b to provide a lost motion connection between the actuator rod 88 and the adjustment spring 89. The adjustment spring 89 includes a coiled end 89b which fits about the cylindrical portion 80d of the adjustment nut 80c.

The load spring means includes springs 106a and 106b mounted on opposite sides of the clutch linkage system extending transversely with respect to the axis of rotation of the clutch between the bell housing 44 and the clutch cover plate 22. One end of each of the load springs is connected to the housing 44 by way of apertures 108 and the opposite ends of the load springs are connected to the control lever 46 by way of apertures 110.

The clutch linkage system may be hermetically sealed with respect to the interior chamber formed by the housing 44 by use of a closure 112 fitted on the housing 44 encompassing the bracket 45, control lever 46, transfer lever 48 and a portion of the control rod 56.

Referring now to the embodiment illustrated in FIGURES 9, 10 and 11, the clutch linkage system includes a bracket 145, control lever 146, transfer lever 148 and release fork 150.

The control lever 146 is adapted to pivot about a first pivot point 152 which is located on the bracket 145. The control lever 146 also includes an end portion 154 which is adapted to engage a control rod or cable (not shown). The control lever 146 also includes a second portion 162 which is adapted to receive a strut 164 therein.

The transfer lever 148 is pivotally mounted on the bracket 145 about a second pivot point 166. The transfer lever 148 includes a first portion 168 which is adapted to receive the strut 164. A resilient member 174 is provided between the control lever 146 and the transfer lever 148 to bias the two levers toward each other and thus to maintain the strut 164 in an operative position between these two levers.

The release fork 150 is connected to the bracket 145 about the second pivot point 166 and the release fork 150 includes a first arm 176. The first arm 176 is provided with an aperture 177 for receipt of the adjustment bolt 180. The adjustment bolt 180 extends through the aperture 177 and is rotatably mounted within the aperture 177. The aperture 177 is larger than the outside diameter of the adjustment bolt 180 such that the adjustment bolt 180 is free to move laterally with respect to the aperture 177. The adjustment bolt 180 includes a head portion 180a and a washer 181 which washer 181 preferably includes one surface having a relatively low coefficient of friction material bonded thereto, which low coefficient of friction material is adapted to engage the first arm 176 of the release fork. A typical low coefficient of friction material would be a coating of thin wafer of Teflon bonded to a conventional metal washer 181. An adjustment nut 180c is nonrotatably mounted within the transfer lever 148 and includes threads which engage complementary threads 180b formed on the adjustment bolt 180. The adjustment nut 180c, in effect, rotatably supports the adjustment bolt 180. The adjustment bolt 180 includes a slot 180e. The release fork 150 includes a second end 186 which engages a clutch release bearing.

An actuator rod 188 (FIGURES 9 and 11) is drivingly connected to the control lever 146 at one end 188a thereof. The other end of the actuator rod 188 includes an elongated slot 188b. An adjustment spring 189 is provided with an end 189a which fits within the elongated slot 188b to provide a lost motion connection between the actuator rod 188 and the adjustment spring 189. The adjustment spring includes a coiled end 189b which fits around the threads 180b of the adjustment bolt 180.

In operation, the clutch is normally maintained in engagement by the load springs 106a and 106b acting to urge the control lever 46 to rotate about the first pivot point 52 in a counterclockwise direction, as viewed in FIGURE 2. The moment exerted by the load springs 106a and 106b on the control lever 46 causes the strut 64 to urge the transfer lever 48 to rotate in a counterclockwise direction about the second pivot point 66 which, in turn, drives the release fork 50 in a counterclockwise direction about its pivot point 66 by way of adjustment bolt 80. The release fork 50 pushes the release bearing 40 to the left and the release bearing 40 urges the inner ends 41 of the clutch release lever 46 in a direction to force the pressure plate 28 against the driven member 32 such that the driven member is maintained in engagement with the driving member or flywheel 20.

The clutch is disengaged by moving the control rod 56 to the left as viewed in FIGURE 2. Movement of the control rod to the left results in creating a clockwise moment of the control lever 46 about the first pivot point 52. This moment is sufficient to overcome the counterclockwise moment exerted on the control lever 46 by the load springs 106a and 106b. This, in turn, allows the control lever 46 to rotate in a clockwise direction about the first pivot point 52. The transfer lever 48 and release fork 50 are shifted clockwise about pivot point 66 due to the action of the clutch disc 32 regaining its original free form with the aid from conventional straps (not shown) which act as retractor springs. Movement of the release bearing 40 continues until the clutch is fully disengaged. Final disengagement of the clutch leaves only the straps exerting a force on the pressure plate and bearing.

The load springs impose an engagement force on the pressure plate which force is maintained during the period of time the clutch is engaged. The force applied to the control lever 46 by the load springs is transmitted by way of strut 64 to the transfer lever 48 and from the transfer lever 48 by way of the adjustment bolt 80 to the release fork 50. Thus, it is noted, the strut 64 is in compression and the adjustment bolt 80 is in tension during the period of time the clutch is engaged.

Movement of the control lever 46 from a clutch engaged position to a clutch disengaged position results in a predetermined movement of the actuator rod 88—which is attached to the control lever—about the first pivot 52. This movement of the clutch linkage from an engaged position to a disengaged position also results in movement of the adjustment spring 89—which is carried by the adjustment nut 80c—about the second pivot. Movement of the actuator rod 88 and the adjustment spring 89 about their respective pivot points results in relative movement between the end 89a of the adjustment spring 89 and the actuator rod 88. The elongated slot 88b of the actuator rod 88 is of a dimension such that the end of the adjustment spring 89 moves from one end of the slot 88b to the other end thereof as the linkage system moves from a clutch engaged position to a clutch disengaged position.

The clutch control linkage incorporates a means for repositioning various members of the control linkage with respect to the control rod 56 upon a predetermined amount of wear of the friction lining material. As the friction linings wear, the pressure plate 28, clutch release levers 26, and release bearing 40 assume new positions, moving toward the left as viewed in FIGURE 2 each time the clutch is engaged. This, of course, occurs in minute increments over thousands of miles of driving.

As lining wear occurs, the control lever 46 rotates gradually counterclockwise and this, in turn, increases the relative movement between the elongated slot 88b of the actuator rod 88 and the end 89a of the adjustment spring 89.

A driver, from force of habit, will depress the clutch pedal a certain amount each time the clutch is disengaged regardless of the state of wear of the clutch linings. Therefore, as wear occurs, the control lever 46 is rotated through a greater angle each time the clutch is disengaged. Meanwhile, the relative travel between the end of the adjustment spring 89 and the actuator rod 88 is of a magnitude greater than the length of the slot 88b in the actuator rod 88.

When a predetermined amount of lining wear has occurred and the clutch is engaged, movement of the actuator rod 88 with respect to the end of the adjustment spring 89 will exceed the length of the slot 88b by an amount sufficient to cause the end of the slot 88b to engage the end of the adjustment spring 89 and move the end of the adjustment spring 89 in a counterclockwise direction with respect to cylindrical portion 80d from a position as illustrated in FIGURE 6 to a position as illustrated in FIGURE 7. Counterclockwise rotation of the adjustment spring 89 with respect to the cylindrical portion 80d results in the coiled end 89b of the adjustment spring 89 slipping with respect to the cylindrical portion 80d. As the clutch is released, the opposite end of slot 88b engages the end of adjustment spring 89 to move the end thereof in a clockwise direction with respect to cylindrical portion 80d from a position as illustrated in FIGURE 7 to a position as illustrated in FIGURE 8. Clockwise movement of the adjustment spring 89 with respect to the cylindrical portion 80d results in the coiled end 89b of the adjustment spring 89 gripping the cylindrical portion 80d of the adjustment nut 80c. This induces a clockwise torque on the adjustment nut 80c.

The adjustment bolt 80, during the period of time the clutch is engaged or partially engaged, is under a tension load. During the period of time the adjustment bolt 80 is under a tension load the torque exerted by the adjustment spring 89 on the adjustment nut 80c is not sufficient to cause rotation of the adjustment nut 80c with respect to the adjustment bolt 80. As the clutch is disengaged, however, the stress on the adjustment bolt 80 is relieved and the torque exerted by the adjustment spring on the cylindrical portion 80d of the adjustment nut 80c is sufficient to cause clockwise rotation of the adjustment nut 80c with respect to the adjustment bolt 80. This shifts the adjustment spring 89 and the adjustment nut 80c from a position as illustrated in FIGURE 7 to a position as illustrated in FIGURE 8. This movement of the adjustment nut 80c with respect to the adjustment bolt 80 reestablishes the desired geometry within the linkage system.

This adjustment upon reengaging the clutch, reestablishes the original respective positions of the release fork and the control rod 56 and reestablishes the original free play in the clutch pedal. The readjustment also reestablishes the original moment exerted by the load springs on the control lever about the first pivot point 52. The above described cycle repeats until the linings are fully worn out.

The embodiment illustrated in FIGURES 9–11 inclusive fits within the clutch assembly in the same manner as the previously described embodiment. The operation of the clutch with this alternative embodiment is similar to the above described embodiment. However, the adjustment means which is provided between the transfer lever 148 and release fork 150 differs from the above described adjustment means.

The adjustment bolt 180 is mounted within the adjustment nut 180c and is then rotatably mounted with respect to the release fork 150 and with respect to the transfer lever 148. The adjustment spring 189 is wrapped directly around the threads 180b of the adjustment bolt 180. The slot 188b in the actuator rod 188 is of a dimension such that the normal stroke of the clutch results in relative movement of the end of adjustment spring 189 from one end of slot 188b to the other end thereof.

Wear of the friction lining material and the resultant increase in relative travel between the adjustment spring 189 and the adjustment rod 188 causes one end of the adjustment spring to engage one end of slot 188b and to rotate the end of the adjustment spring in a clockwise direction with respect to the adjustment bolt 180 (FIGURE 9). This action results from the clutch pedal assuming a new position in its engaged position which new position is a function lining wear. Clockwise rotation (FIGURE 9) of the adjustment spring 189 with respect to the adjustment bolt 180 results in the adjustment spring slipping on the threads of the adjustment bolt 180. As the clutch is disengaged by the driver depressing the clutch pedal to a normal position the end of the adjustment spring 189 engages the opposite end of slot 188b and the end of the adjustment spring 189 is deflected in a counterclockwise direction until the clutch is disengaged at which time the stress in the adjustment bolt 180 is relieved and the counterclockwise torque exerted by the adjustment spring is sufficient to cause counterclockwise rotation of the adjustment bolt 180 with respect to the adjustment nut 180c. Rotation of the adjustment bolt 180 with respect to the adjustment nut 180c reestablishes the geometry of the clutch linkage system and thus provides an automatic adjustment to compensate for wear.

With the improvement achieved by use of this clutch assembly, it is possible to simplify the clutch pedal hardware. For example, the clutch pedal may be connected directly to the control rod 56 by way of a light, inexpensive cable operating over sheaves thus eliminating the convential equalizer shaft, over center springs, etc.

While this invention is described in connection with certain specific preferred embodiments, it is understood to be by way of illustration only and not by way of illustration only and not by way of limitation. The claims should, therefore, be construed as broadly as the prior art will permit.

What is claimed is:

1. A clutch comprising a driving member, a pressure plate, and a driven member interposed between said driving member and said pressure plate; a housing surrounding said driving member, said pressure plate and said driven member; a cover plate connected to said driving member surrounding said pressure plate and said driven member defining a space between said cover plate and said housing; a clutch release bearing slidable axially; a plurality of clutch release members connected to said cover plate and engaging said clutch release bearing; a control lever pivotally connected to said housing; a transfer lever pivotally connected to said housing adapted to engage said control lever; a release fork pivotally connected to said housing in engagement with said transfer lever, said control lever and said release fork arranged to move a predetermined distance relative to each other as said elements move from a clutch engaged position to a clutch disengaged position and to move an additional distance relative to each other which additional distance is in excess of said predetermined distance, said additional distance being proportional to clutch lining wear, and adjustment means responsive to relative movement between said control lever and said release fork through said additional distance effective to readjust the relative positions of said release fork and said transfer lever.

2. A clutch comprising a driving member, a pressure plate, a driven member, a cover plate connected to said driving member, a clutch release bearing slidably positioned with respect to said cover plate, a plurality of clutch release members connected to said cover plate adapted to connect said clutch release bearing and said pressure plate; a housing surrounding said cover plate providing a space between said cover plate and said housing, a control lever pivotally mounted to said housing, a transfer lever pivotally mounted to said housing adapted to engage said control lever, a release fork pivotally mounted on said housing, a control rod connected to said control lever effective to actuate same, resilient means effective to urge said release bearing toward said clutch release members, an adjustment means including a bolt and nut interconnecting said release fork and said transfer lever effective to provide a drive therebetween, means connected to said control lever and said adjustment means effective to cause small incremental adjustments of said adjustment means as a function of relative movement between said control lever and said adjustment means.

3. A clutch linkage system comprising a bracket suitable for connection with a clutch housing structure; a first pivot point on said bracket; a second pivot point on said bracket; a control lever connected to said first pivot point; a transfer lever connected to said second pivot point adapted to be driven by said control lever; a release fork pivotally connected to said second pivot point adapted to engage a clutch release bearing, adjustment means interposed between said release fork and said transfer lever effective to provide a drive therebetween and means connected to said control lever and said adjustment means effective to readjust said adjustment means as a function of friction lining wear.

4. Clutch control linkage suitable for actuating a clutch release bearing comprising a housing surrounding said clutch release bearing, a control lever connected to said housing adapted to pivot with respect thereto, a control rod connected to said control lever, a transfer lever pivotally connected to said housing, a release fork pivoted on said housing adapted to be driven by said transfer lever, adjustment means interposed between said release fork and said transfer lever effective to provide a drive therebetween, said adjustment means including an adjustment bolt connected to said release fork and said transfer lever and means responsive to the relative travel between said control lever and said release fork to establish an effective length of said adjustment bolt.

5. A clutch comprising a driving member, a pressure plate and a driven member interposed between said driving member and said pressure plate; a housing surrounding said driving member, said pressure plate and said driven member; a cover plate connected to said driving member; a plurality of clutch release levers operatively connected to said cover plate and said pressure plate; a clutch release bearing connected to said clutch release levers; a control lever pivotally connected to said housing, a transfer lever pivotally connected to said housing, a release fork pivotally connected to said housing and connected to said transfer lever, said release fork being operable to shift said clutch release bearing; an adjustment bolt rotatably supported in said release fork; an adjustment nut nonrotatably supported within said transfer lever, an actuator rod having a slot in one end thereof connected to said control lever, an adjustment spring having one end disposed in said slot and having the other end connected to said adjustment bolt whereby engagement of said adjustment spring with one end of said slot is effective to cause relative rotation of said adjustment spring with respect to said adjustment bolt and whereby engagement of said adjustment spring with the other end of said slot is effective to cause rotation of said adjustment bolt with respect to said adjustment nut.

6. A clutch comprising a driving member, a pressure plate and a driven member interposed between said driving member and said pressure plate; a housing surrounding said driving member, said pressure plate and said driven member; a cover plate connected to said driving member surrounding said pressure plate and said driven member; a plurality of clutch release levers operatively connected to said cover plate and said pressure plate; a control lever pivotally connected to said housing; a transfer lever pivotally connected to said housing; a strut interposed between said control lever and said transfer lever, and a release fork in engagement with said transfer lever providing means to actuate said clutch release lever.

References Cited by the Examiner

UNITED STATES PATENTS

| 1,927,643 | 9/1933 | Hughes | 192—99 |
| 2,248,378 | 7/1941 | Nutt | 192—68 |

DAVID J. WILLIAMOWSKY, *Primary Examiner.*

A. T. McKEON, *Assistant Examiner.*